United States Patent [19]

Blakeslee

[11] Patent Number: 4,512,140
[45] Date of Patent: Apr. 23, 1985

[54] STUB DRAPER DRIVE FOR DRAPER HEADER

[75] Inventor: Edward A. Blakeslee, New Holland, Pa.

[73] Assignee: Sperry Corporation, New Holland, Pa.

[21] Appl. No.: 532,945

[22] Filed: Sep. 16, 1983

[51] Int. Cl.³ .................... A01D 35/14; A01D 57/20
[52] U.S. Cl. .................... 56/11.6; 56/11.4; 56/181; 56/192
[58] Field of Search ............... 56/181, 192, 14.5, 11.6, 56/11.4

[56] References Cited

U.S. PATENT DOCUMENTS

| | | | |
|---|---|---|---|
| 3,079,742 | 3/1963 | Balzer | 56/192 |
| 3,343,347 | 9/1967 | Burrough et al. | 56/181 |
| 3,545,184 | 12/1970 | Liepold et al. | 56/10.4 |
| 3,901,004 | 8/1975 | Barnes | 56/10.4 |
| 4,429,517 | 2/1984 | Lohrentz et al. | 56/11.2 |

OTHER PUBLICATIONS

"Haying Equipment", pp. 38, 39, 44, 45, 50, 51.

Versatile, "Hydrostatic Self-Propelled Swathers SP4400 & 400", Brochure (No. 67-79), C. 1980.

Primary Examiner—Paul J. Hirsch
Attorney, Agent, or Firm—Larry W. Miller; Frank A. Seemar; Darrell F. Marquette

[57] ABSTRACT

A draper header attachable to a base tractor unit to harvest standing crop material and create a windrow by using draper conveyors to consolidate the severed crop material is disclosed wherein the draper header includes three draper sections, two of which are transversely shiftable to vary the location of a crop discharge opening. The third draper section is fixed along the right side of the header and is rotatable to convey severed crop material inwardly away from the header sidesheet to displace the windrow away from any uncut crop material when the crop discharge opening is adjacent thereto. Although the shiftable draper sections are rotatably driven by hydraulic motors, the fixed draper section is mechanically driven from a transverse drive shaft forming a part of the drive mechanism to the reciprocating cutterbar having a pair of counter-reciprocating sickles.

10 Claims, 15 Drawing Figures

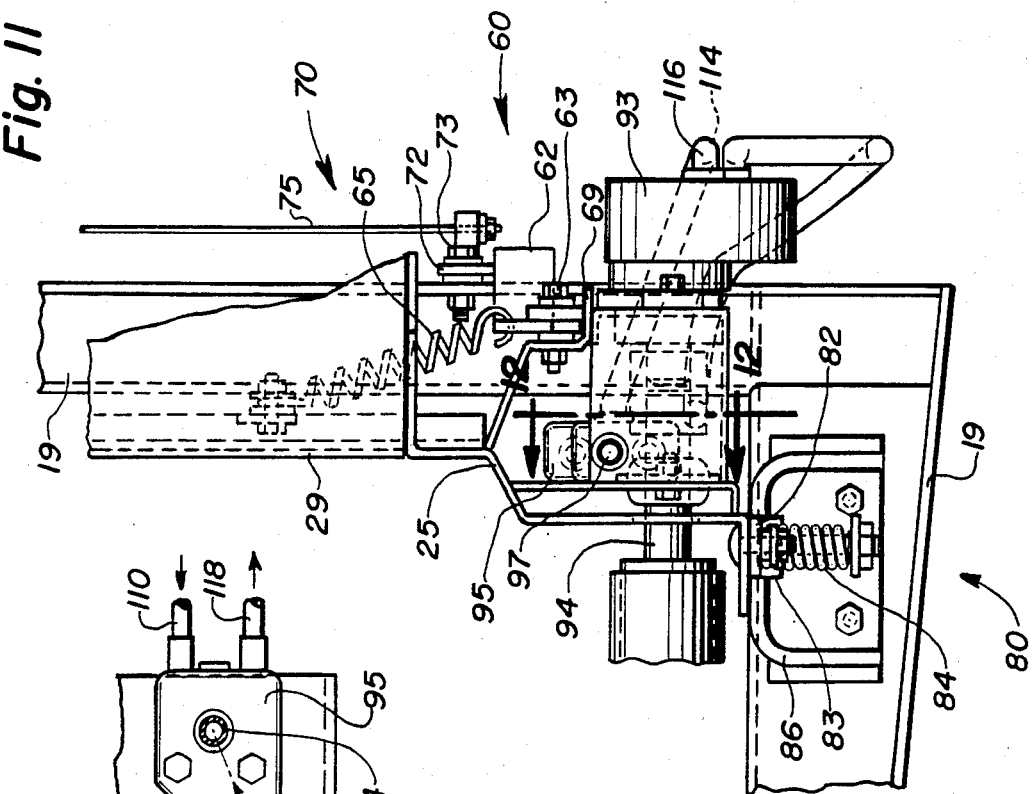
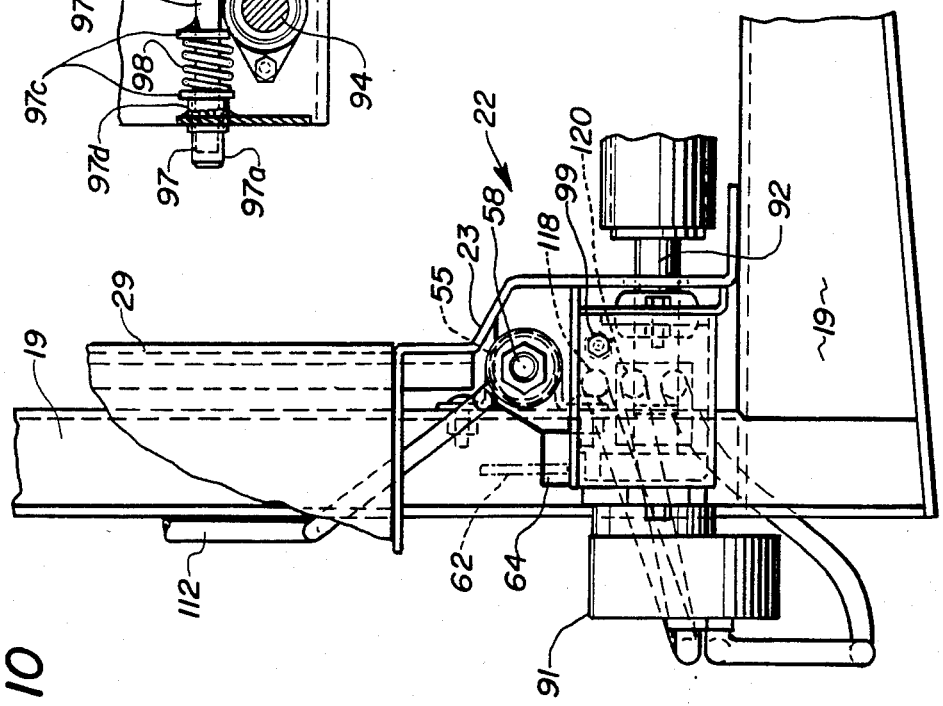

STUB DRAPER DRIVE FOR DRAPER HEADER

BACKGROUND OF THE INVENTION

The present invention relates generally to draper windrowers that create a windrow of severed crop material by consolidating the crop with shiftable draper conveyors and, more particularly, to a drive mechanism for a fixed stub draper operable to locate the windrow away from uncut crop material.

The utilization of a stub draper adjacent the right outboard end of a draper header to displace the location of a windrow away from the right side of the header and, therefore, away from uncut crop material traditionally outboard of the right side of the header, necessitates a drive mechanism to rotatably power the draper on the stub draper section. The use of hydraulic drive components or a special mechanical drive extending from a centrally located source of rotational power is expensive and somewhat cumbersome as the stub draper is located at an extreme outboard position.

SUMMARY OF THE INVENTION

It is an object of this invention to overcome the aforementioned disadvantages of the prior art by providing a drive for rotatably powering a draper on a stub draper section operatively powered from the mechanical drive for the reciprocating cutterbar.

It is another object of this invention to drive the stub draper off the power input shaft to the wobble unit of the reciprocating cutterbar.

It is a feature of this invention that a draper header incorporating a pair of counter-reciprocating sickles for the cutterbar can utilize the cutterbar drive mechanism for powering the rotation of the draper on the stub draper section.

It is an advantage of this invention that the stub draper is driven whenever the cutterbar is reciprocated to sever standing crop material.

It is another feature of this invention that the stub draper section is driven in a constant direction irrespective of the direction of rotation of the adjacent shiftable draper sections.

It is still another object of this invention to provide a tensioning idler that is adjustable in two directions to maintain proper positional relationship between the drive belt for powering the stub draper and the tensioning idler.

It is still another feature of this invention that the tensioning idler is mounted on a bracket that is both pivotally adjustable and slidingly adjustable to properly tension the belt for driving the stub draper.

It is a further object of this invention to provide a drive mechanism for operatively powering the rotation of the draper on a stub draper section which is durable in construction, inexpensive of manufacture, carefree of maintenance, facile in assemblage and simple and effective in use.

These and other objects, features and advantages are accomplished according to the instant invention by providing a draper header attachable to a base tractor unit to harvest standing crop material and create a windrow by using draper conveyors to consolidate the severed crop material wherein the draper header includes three draper sections, two of which are transversely shiftable to vary the location of a crop discharge opening. The third draper section is fixed along the right side of the header and is rotatable to convey severed crop material inwardly away from the header sidesheet to displace the windrow away from any uncut crop material when the crop discharge opening is adjacent thereto. Although the shiftable draper sections are rotatably driven by hydraulic motors, the fixed draper section is mechanically driven from a transverse drive shaft forming a part of the drive mechanism to the reciprocating cutterbar having a pair of counter-reciprocating sickles.

BRIEF DESCRIPTION OF THE DRAWINGS

The advantages of this invention will become apparent upon consideration of the following detailed disclosure of the invention, especially when taken in conjunction with the accompanying drawings wherein:

FIG. 10 is a detail elevational view of the rearward portion of the left draper section corresponding to lines 10—10 of FIG. 8;

FIG. 11 is a detail elevational view of the rearward portion of the right draper section corresponding to lines 11—11 of FIG. 8;

FIG. 12 is a detail cross-sectional view of the reversing valve affixed to the right draper section as taken along lines 12—12 of FIG. 11;

DETAILED DESCRIPTION OF THE PREFERRED EMBODIMENT

Figure 1:
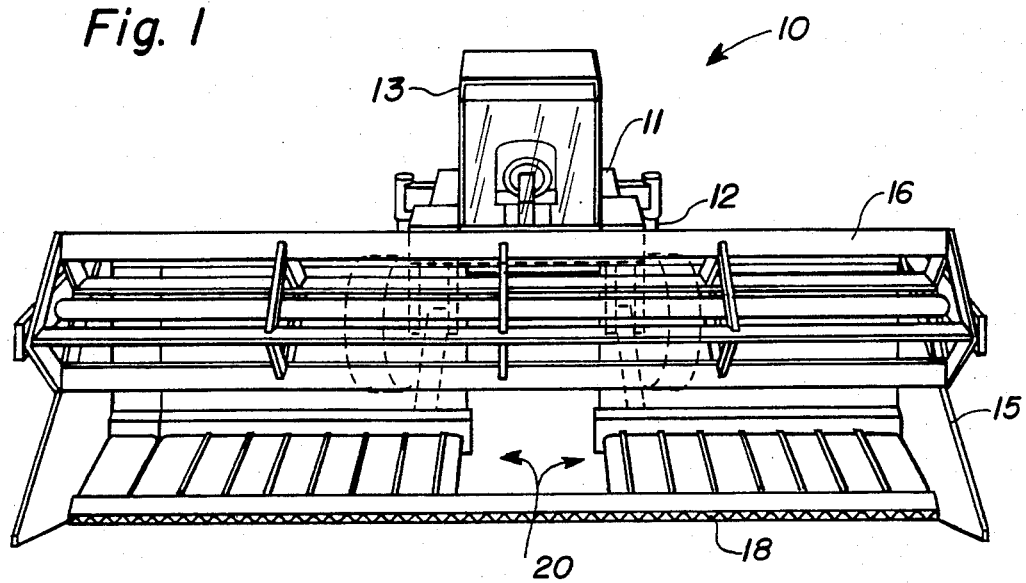
FIG. 1 is a front elevational view of a windrower equipped with a draper header, set up for center delivery of the crop material, incorporating the principles of the instant invention.

Referring now to the drawings and, particularly, to FIG. 1, a front elevational view of a windrower equipped with a draper header can be seen. Any left and right references are used as a matter of convenience and are determined by standing at the rear of the machine, facing the forward end, the direction of travel. The windrower 10 is comprised of a tractor 11 having a wheeled frame 12 permitting movement across the field. An operator's platform 13 is mounted on the frame 12 to provide an overall view of the harvesting operation occurring before him. The header 15 is forwardly connected to the frame 12 to engage standing crop material as the windrower 10 moves across the field. The header 15 includes a reel 16 driven by a hydraulic motor 38 connected to a source of hydraulic power by hoses 39 to sweepably engage standing crop over a cutterbar 18 which severs the standing crop to be conveyed rearwardly onto the draper conveyor 20 for consolidating the severed crop into a windrow.

Figure 2:
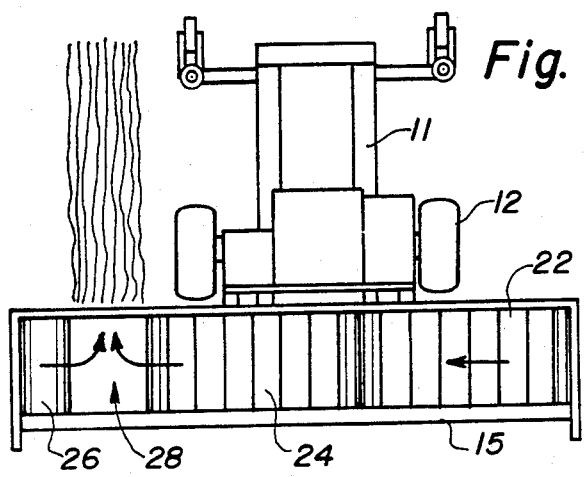
FIG. 2 is a schematic top plan view of the windrower seen in FIG. 1 with the draper sections being set up for right side discharge.
Figure 3:
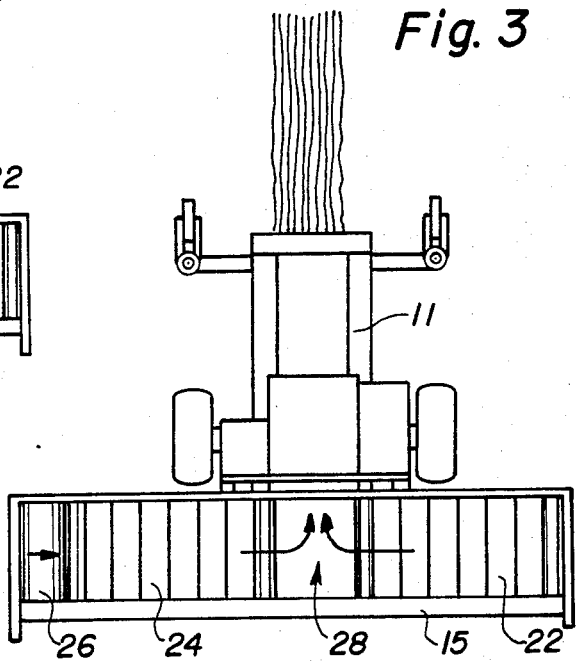
FIG. 3 is a schematic top plan view similar to FIG. 2 with the draper section set up for center crop discharge.
Figure 4:
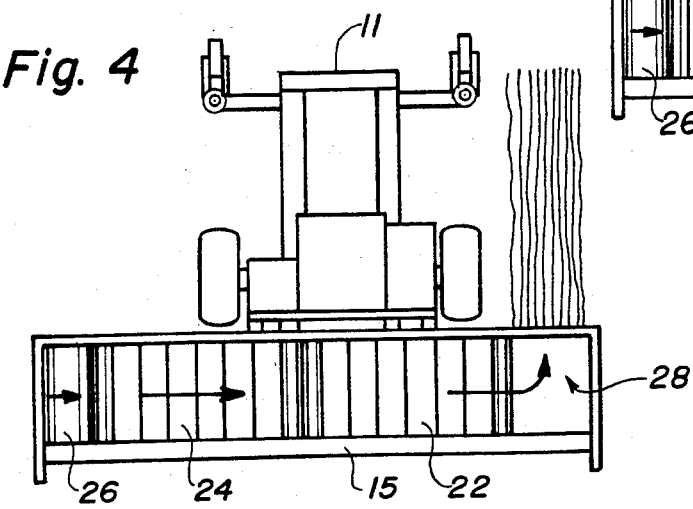
FIG. 4 is a schematic top plan view similar to FIGS. 2 and 3 with the draper sections set up for left side crop discharge.

As seen in FIGS. 1-4, the draper conveyor 20 includes a left draper section 22, a right draper section 24 and a stub or short draper section 26 disposed along the right side of the header 15. The left and right draper sections 22,24 are movably mounted on the header subframe 19 for transverse movement relative thereto. Since the cumulative width of the draper sections 22,24,26 is less than the total width of the header 15; a discharge opening 28 is provided for the discharge of crop material off the draper conveyor 20 onto the ground into a windrow. By shifting the left and right draper sections 22,24 to an extreme left transverse position, the discharge opening 28 is positioned between the short draper section 26 and the right draper section 24, as shown in FIG. 2. As seen in FIG. 4, the left and right draper sections 22, 24 can be shifted to an extreme right transverse position adjacent the short draper 26 to position the discharge opening 28 along the left end of the header 15. Alternatively, the left and right draper sections 22,24 can each be moved into respective extreme left and right transverse position to position the discharge opening 28 generally centrally of the header 15 to discharge the crop windrow beneath the tractor 11.

Figure 5:
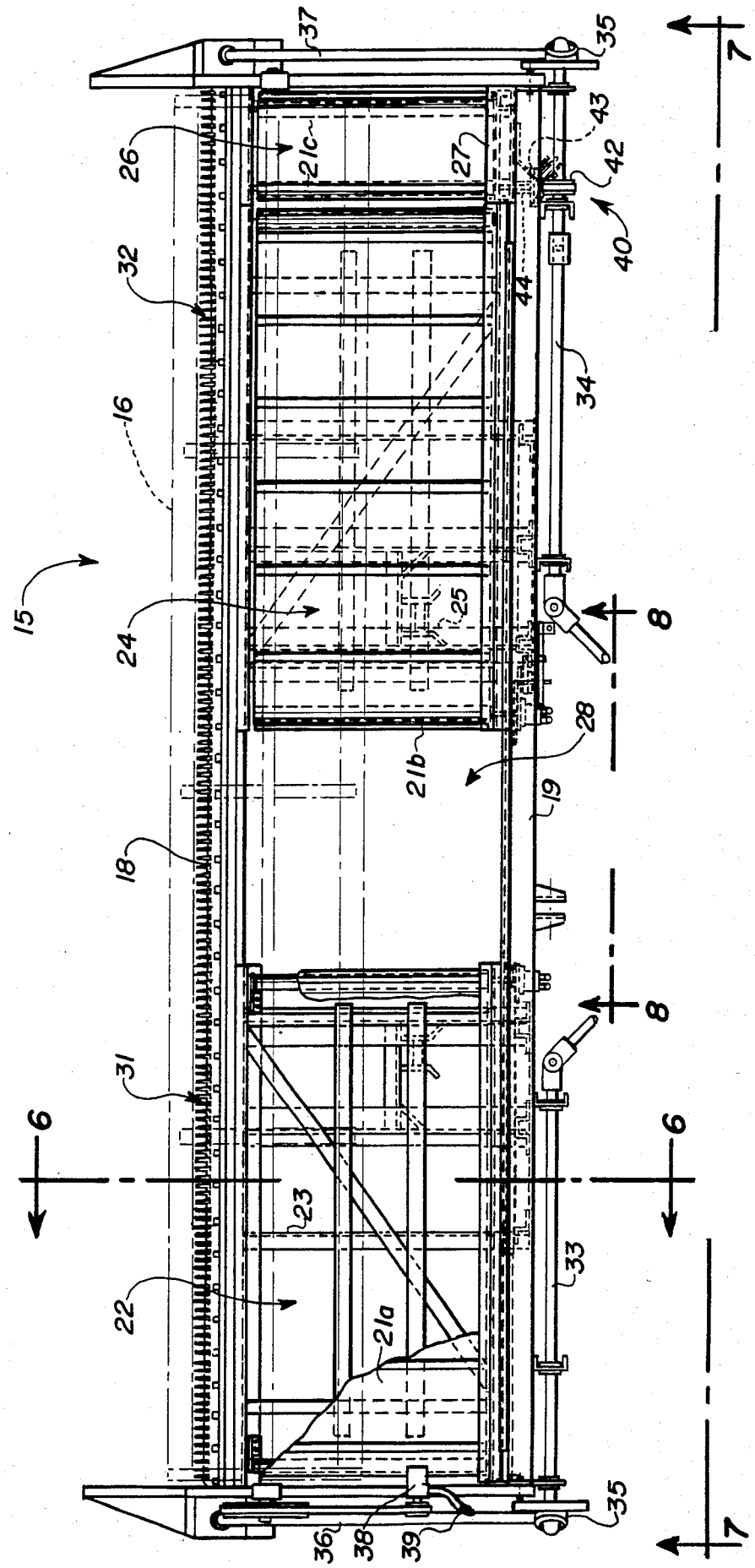
FIG. 5 is an enlarged top plan view of the draper header shown in FIG. 1 with portions of the left draper section being broken away and the reel being shown in phantom for purposes of clarity.
Figure 6:
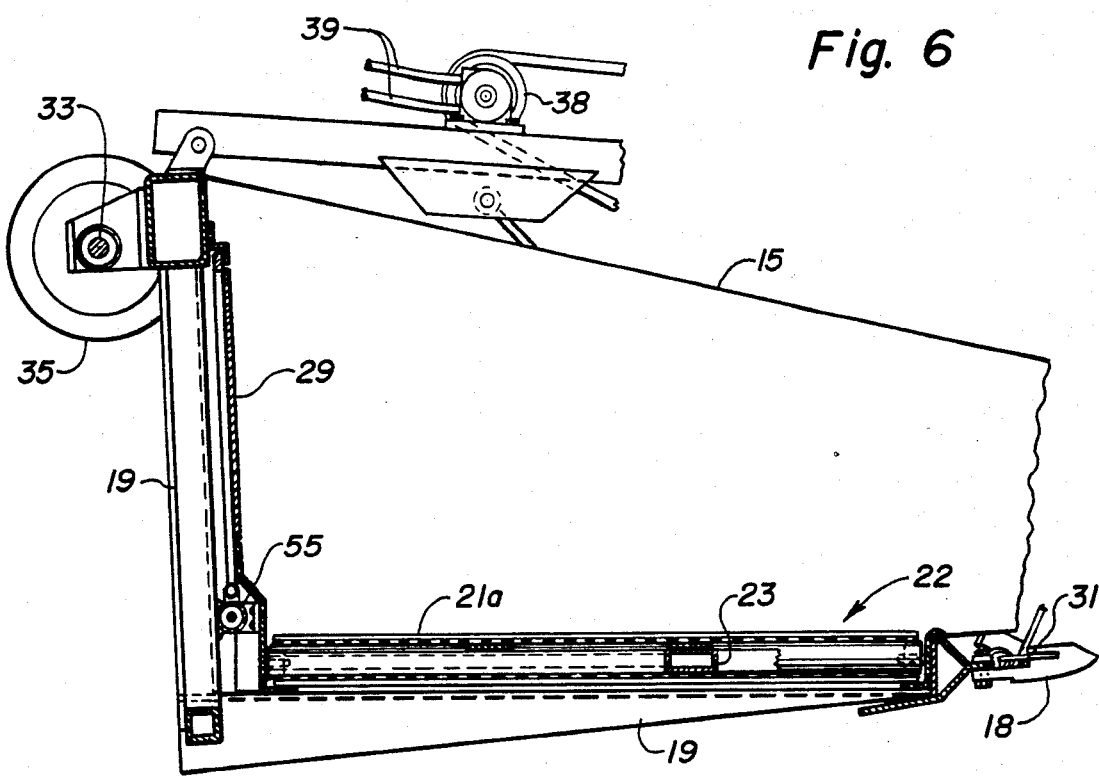
FIG. 6 is an enlarged cross-sectional view of the draper header seen in FIG. 5 taken along lines 6—6 through the left draper section, the reel and crop divider being broken away for clarity.
Figure 7:
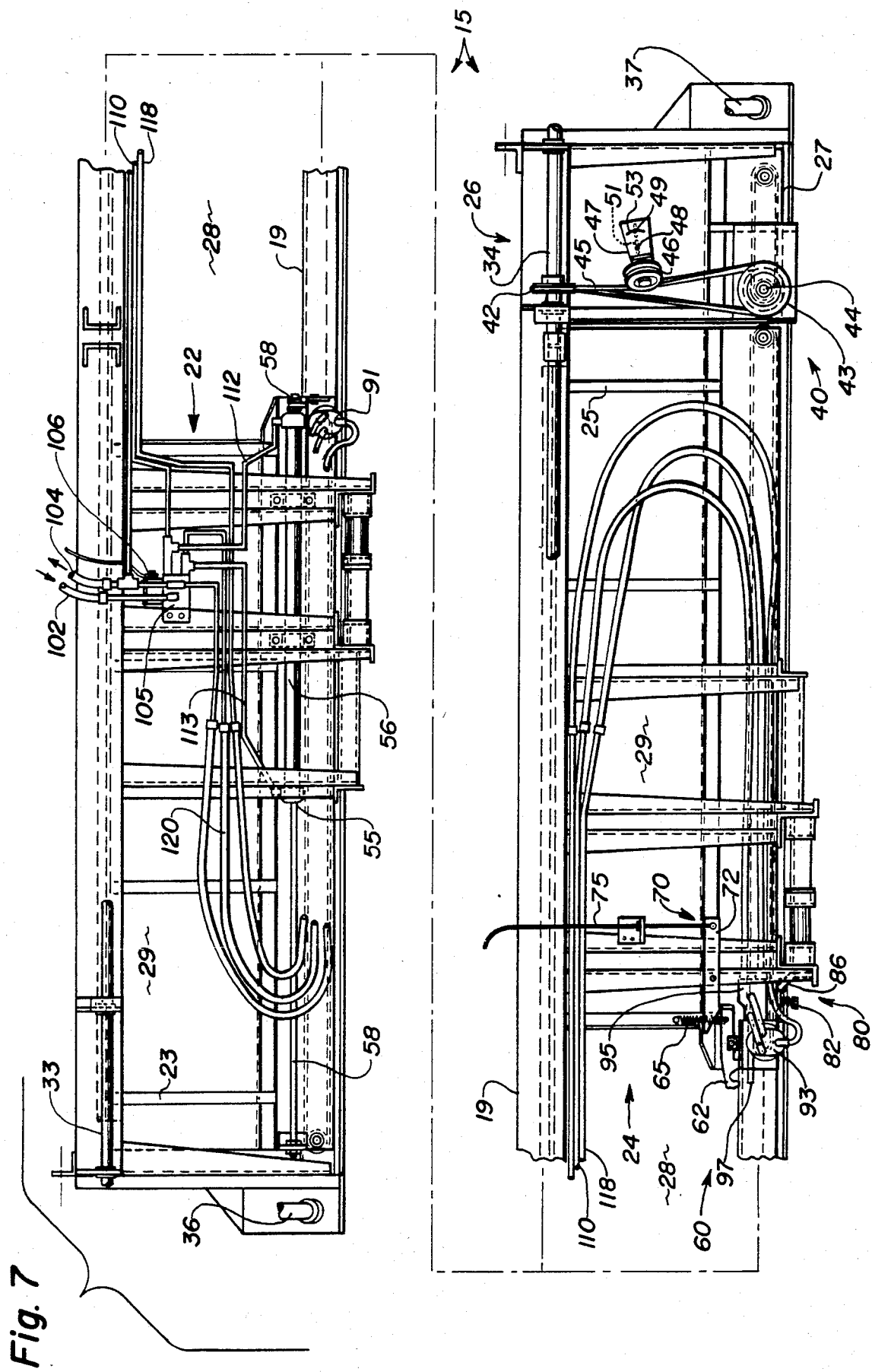
FIG. 7 is a partial enlarged rear elevational view of the draper header shown in FIG. 5 corresponding to lines 7—7, the header being broken into two halves along a match line M, the reel and certain drive components being broken away for purposes of clarity.

Referring now to FIGS. 5, 6 and 7, the structural details of the draper header shown in FIG. 1 can be seen. Each draper sections 22,24,26 is generally comprised of a slatted endless draper 21a,21b,21c, respectively, mounted for rotation in a transverse direction on a troller frame 23,25 and 27, respectively. The left trolley frame 23 and the right trolley frame 25 include generally vertical back portions 29 and are slidably movable relative to the header subframe 19 upon which they are supported. The short trolley frame 27 is fixed to the header subframe 19 to prevent the short draper 26 from laterally shifting. By maintaining the short draper section 26 in a fixed position relative to the header subframe 19, the discharge opening 28 is kept inwardly of the right end of the header 15. The cutterbar 18 includes a pair of counter-reciprocating sickles 31,32 such as described in U.S. Pat. No. 3,577,716 granted to H. G. McCarty et al on May 4, 1971. The drive for reciprocating the sickles 31,32 begins at a centrally located source of rotational power (not shown) mounted on the tractor 11. Left and right shafts 33,34 rotatably supported by the header subframe 19 transfer the rotational power to a wobble unit 35 mounted at each respective end of the header 15. As is known in the art, the wobble unit 35 transforms the rotational input from the shafts 33,34 into a reciprocating output transferred by left and right wobble shafts 36,37 to the corresponding sickles 31,32.

The rotational drive mechanism 40 for powering the rotation of the draper 21 on the short draper section 26 is best seen in FIGS. 5 and 7. A driven pulley 42 is mounted on the right cutterbar drive shaft 34 for rotation therewith. A driven pulley 43 is affixed to a draper drive shaft 44 rotatably supported by the fixed trolley frame 27 for rotatably driving the draper 21c. An endless flexible belt 45 is entrained around the drive pulley 42 and the driven pulley 43 to transfer rotational power therebetween. It should be noted that the flexible belt 45 permits the transfer of power from one plane to a second plane generally perpendicularly disposed to the first plane. A tensioning idler 46 is mounted on a bracket 47 for engagement with the belt 45. The idler 46 is positionally movable relative to the bracket 47 along the line of the axis thereof to adjust and maintain proper tension in the belt 45. The bracket 47 is adjustable in two directions to permit movement of the tensioning idler 46 to properly align the idler 46 with the belt 45. The bracket 47 is mounted to the header subframe 19 by a pivot bolt 48 and a guide bolt 49 which are linearly movable within corresponding slot-shaped holes 51 formed within the header subframe 19. An arcuate slot 53 formed within the bracket 47 permits a pivotal movement of the bracket 47 about the pivot bolt 48 with the guide bolt 49 traveling within the arcuate slot 53. This two-way movement of the bracket 47 relative to the header subframe 19 permits an alignment between the idler 46 and the belt 45, due to the 90° change in the plane of rotation at opposing ends of the belt 45, to gain and maintain the proper attitude between the idler 46 and the belt 45.

The lateral shifting movements of the left and right draper sections 22,24 are operatively powered by the hydraulic cylinder 55. The barrel 56 of the cylinder 55 is affixed to the header subframe 19 so as to be stationary relative thereto. The ram 58 is extendable from both ends of the barrel 56. As best in FIG. 7, the ram 58 is connected to the left trolley frame 23 at the opposing transverse end with the barrel 56 positioned therebetween. Accordingly, the hydraulic cylinder 55 also serves as a guide to help track the shifting movements of the left draper section 22 along the header subframe 19. The source of hydraulic power to the cylinder 55 will be discussed in further detail below.

The right draper section 24 is equipped with an inter-trolley latching mechanism 60 to selectively connect the right draper section 24 to the left draper section 22 so that the hydraulic shifting cylinder 55 can also power the lateral movement of the right draper section 24. Referring now to FIGS. 7, 8, 9 and 11, the latching mechanism 60 can best be seen. A latching member 62 is pivotally connected by a bolt 63 to the right trolley frame 25 and is cooperatively engageable with a securing tab 64 affixed to the left trolley frame 23 to connect the right draper section 24 to the left draper section 22. The latching member 62 includes a cam portion 66 and a hooking portion 68. Upon engagement with the securing tab 64, the cam portion 66 effects a pivotal rotation of the latching member 62 about the connecting bolt 63 so that the hooking portion 68 can engage the securing tab 64. A spring 65 interconnecting the right trolley frame 25 and the latching member 62 biases the latching member 62 into a position in which the cam portion 66 will engage the securing tab 64 when the left draper section is moved adjacent the right draper section 24. A plate 69 beneath the latching member 62 serves as a stop to limit the biased movement of the latching member 62.

Figure 9:
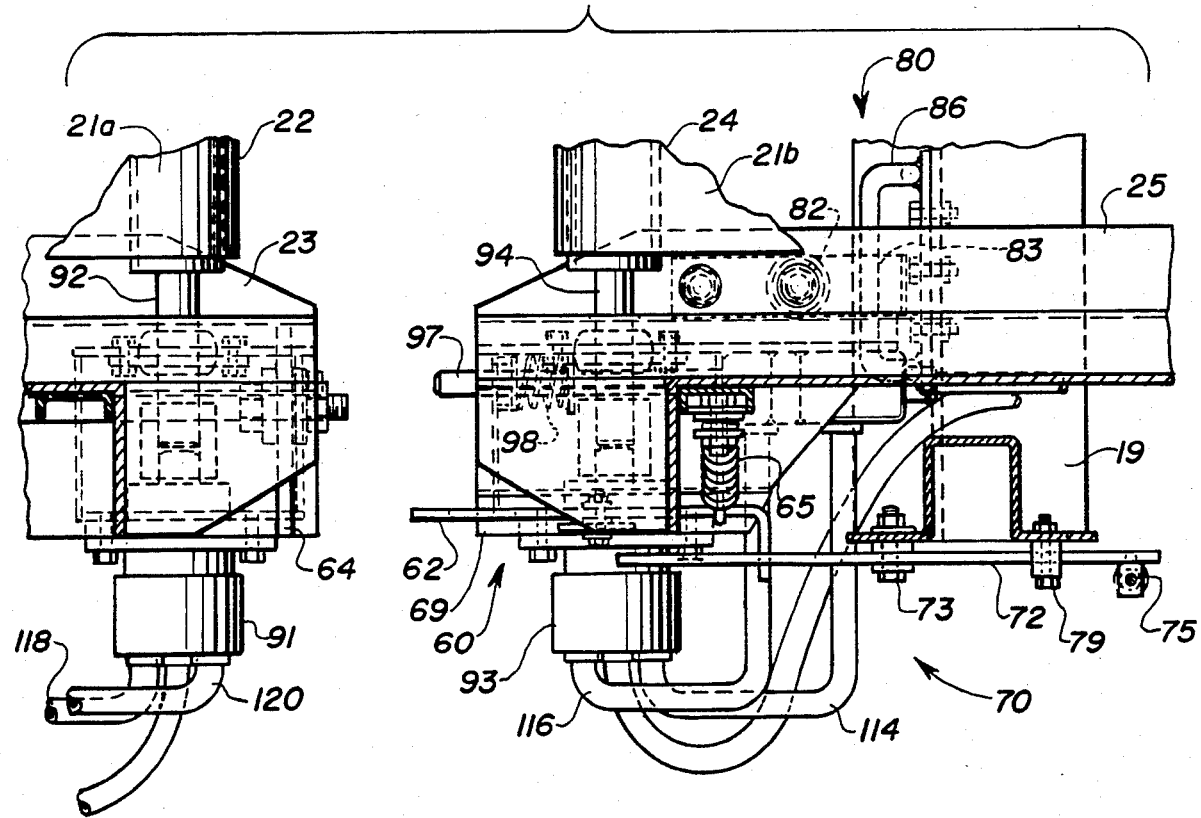
FIG. 9 is a partial top plan view of the central, rearward portion of the draper header corresponding to lines 9—9 of FIG. 8.
Figure 8:
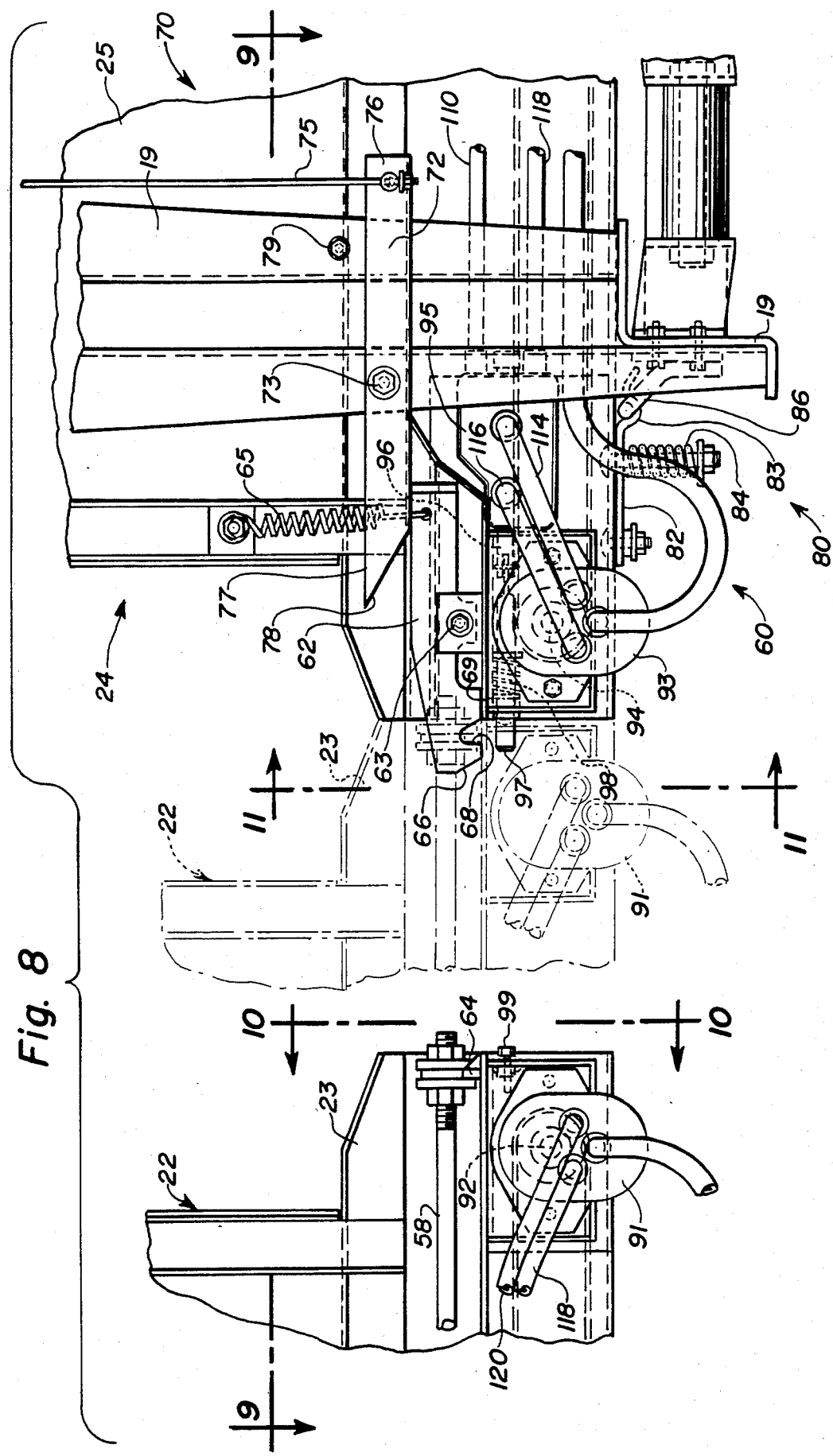
FIG. 8 is an enlarged partial rear elevational view of the central portion of the draper header seen in FIG. 5 corresponding to lines 8—8, the movement of the left draper section being shown in phantom.

Accordingly, it can be seen that when the left draper section 22 is shifted by the hydraulic cylinder 55 to a position adjacent the right draper section 24, the latching mechanism 60 automatically connects the two draper sections 22,24 for a simultaneous movement by the cylinder 55. To unlatch the right draper section 24 from the left draper section 22, a release mechanism 70 is provided, which is best shown in FIGS. 8, 9 and 11. A trip link 72 is pivotally connected to the header subframe 19 by a connecting bolt 73. A cable 75 connected to the actuating end 76 of the trip link 72 extends into the operator's platform 13 to permit the operator to selectively control the rotation of the trip link 72 about the pivot 73. The opposing camming end 77 of the trip link 72 includes a cam surface 78 engageable with the latching member 62 to assure positioning of the trip link 72 above the latching member 62 when the right draper section 24 is in its extreme right transverse position. A stop bolt 79 is mounted on the header subframe 19 to limit the rotational movement of the trip link 72, primarily to keep the camming end 77 from dropping below a position necessary for proper engagement between the cam surface 78 and the latching member 62.

It should be noted that the release mechanism 70 is fixed relative to the header subframe 19, such that the release mechanism 70 can only operatively engage the latching mechanism 60 when the right draper section 24 is in its extreme right transverse position. By pulling on the cable 75, the operator can affect a pivotal rotation of the trip link 72 to exert a corresponding pivotal rotation of the latching member 62 and thereby cause the hooking portion 68 to release the securing tab 64 on the left draper section 22. Subsequent manipulation of the hydraulic cylinder 55 will move the left draper section 22 away from the right draper section 24 and complete the unlatching process. A release of the cable 74 allows the spring 65 to return the latching member 62 into an engagement position against the stop plate 69 and, thereby return the trip link 72 to its initial position.

As is best seen in FIGS. 8, 9 and 11, a retention mechanism 80 is provided to retain the right draper section 24 in its extreme right transverse position when not coupled to the left draper section 22. The retention mechanism 80 includes a spring clip 82 having a clasp 83 biased toward the right trolley frame 25 by the spring 84, and a looped retaining member 86 affixed to the header subframe 19 at a position to be engageable with a clasp 83. The spring 84 exerts sufficient force on the clasp 83 to prevent it from disengaging from the retaining member 86, keeping the right draper section 24 in its extreme right transverse position even under side hill conditions. However, the spring 84 is yieldable to the force exerted by the hydraulic cylinder 55 to permit the right draper section 24 to move in conjunction with the left draper section 22 when connected together by the latching mechanism 60.

Referring to FIGS. 7–15, it can be seen that the transverse rotative movement of the drapers 21a and 21b on the shiftable draper sections 22,24 are powered by hydraulic motors 91,93, respectively. Each motor 91,93 is connected to a corresponding draper drive shaft 92,94 to affect the rotation of the corresponding draper 21a,21b and is reversable with regard to the direction of rotation in accordance with the direction of the flow of hydraulic fluid through the motor 91,93, as will be described in further detail below. As is indicated in FIGS. 2—4, the desired direction of rotation of the drapers 21a,21b is dependent upon the relative positions between the draper sections 22,24 and the header subframe 19. When the draper sections 22,24 are connected together and are shifted into an extreme left transverse position, the direction of rotation of the drapers 21a,21b must convey crop material to the right toward the discharge opening 28. Similarly, when the draper sections 22,24 are connected together and are shifted into the extreme right transverse position, the drapers 21a,21b must rotate in the same direction to convey crop to the left. However, when the draper sections 22,24 are separated and each is in its respective extreme transverse position, the direction of rotation of the drapers 21a,21b must be in opposing directions to convey crop toward the discharge opening 28 at the central part of the header 15.

A reversing valve 95 is provided on the right draper section 24 in operative association with the hydraulic motor 93 to control the direction of rotation of the right draper 21b in response to the relative position of the left draper section 22. The reversing valve 95 includes a movable spool 96 to control the direction of hydraulic fluid through the right hydraulic motor 93 relative to the flow through the left hydraulic motor 91. Connected to the spool 96 is a spring loaded push rod 97 extending beyond the right trolley frame 25 to be engageable with the left trolley frame 23 to sense the proximate position thereof when the left draper section 22 has moved adjacent the right draper section 24. The spool 96 is biased by an internal spring (not shown) such that the push rod 97 is extended toward the left draper section 22, thereby directing the hydraulic fluid through the right hydraulic motor 93 in such a manner that the right draper 21b rotates in the opposite direction to the left draper 21a when the draper sections 22,24 are not connected together. The push rod 97 is constructed of a sensing member 97a positioned for telescopically receiving a second member 97b, which in turn is connected to the spool 96. A spring 98 biases the sensing member 97a and the second member 97b apart. Appropriately positioned washers 97c welded to the members 97a,97b cooperate with a collar 97d to retain the push rod 97 in an assembled condition. When the spool 96 bottoms out in the valve 95, the spring 98 will yield, permitting the members 97a,97b to move toward each other and, thereby accommodate any changes in the distance between the left trolley 23 and the right trolley 25 when they are moved adjacent one another. An actuation member 99 is provided on the left trolley frame 23 to engage the push rod 97 when the left draper section 22 moves next to the right draper section 24 and effect a movement of the spool 96.

A hydraulic circuit 100, connectable to a pump (not shown) appropriately mounted on the tractor 11, provides a source of hydraulic fluid under pressure to both hydraulic motors 91,93 and to the hydraulic cylinder 55. The inflow line 102 carries hydraulic fluid from the pump (not shown) to the primary valve 105. A solenoid control spool 106 electrically controlled by the operator from the operator's platform 13, controls the direction of fluid flow through the valve 105. The return line 104 returns the flow of hydraulic fluid from the valve 105 back to the tractor 11.

Figure 13:
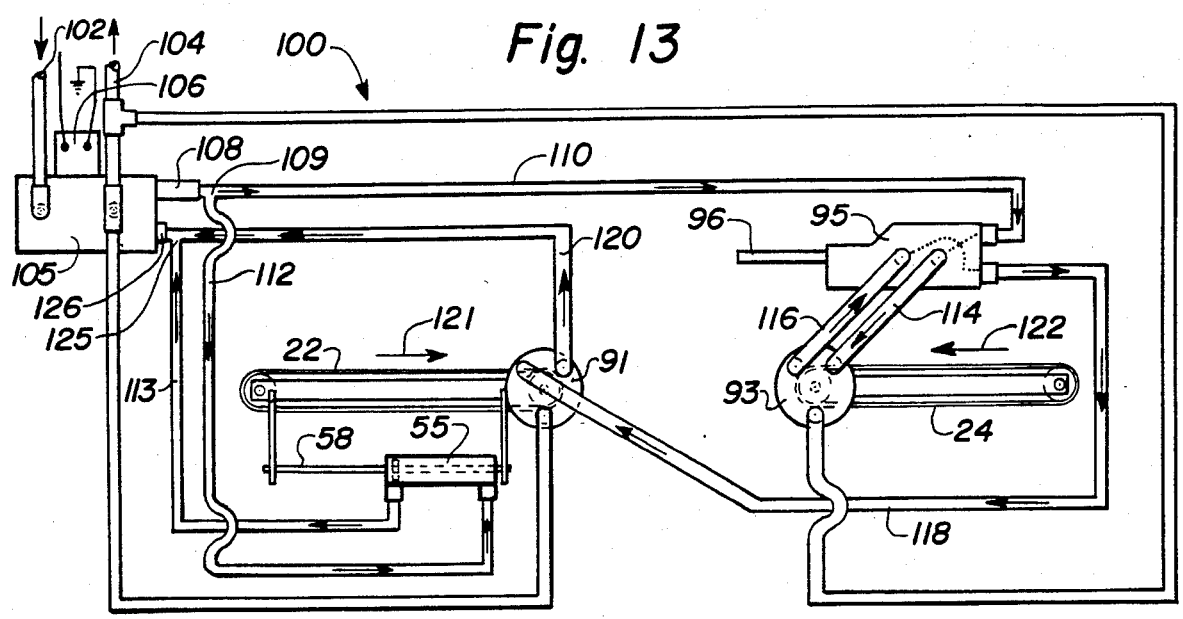
FIG. 13 is a diagrammatic view of the hydraulic system for the draper header with the draper sections being positioned in their respective extreme transverse positions for a central crop discharge.

Referring now to the diagrammatic view seen in FIG. 13, when it is desirable to have the left draper section shifted to its extreme left transverse position, the solenoid controlled spool 106 is shifted to send the flow of fluid outwardly from the valve 105 through line 108. Hydraulic fluid arriving at the tee 109 can go through line 110 to the reversing valve 95 and ultimately to the hydraulic motors 91,93 or via line 112 to the hydraulic cylinder 55. Since the hydraulic circuit 100 is set up such that the hydraulic cylinder 55 requires less pressure to operate than the hydraulic motors 91,93, hydraulic fluid entering the tee 109 will flow through the line 112 until the hydraulic cylinder 55 has reached the end of its stroke, fluid returning through line 113 through valve 105 to the return line 104, thereby shifting the left draper section 22 to its extreme left transverse position before fluid flow through line 110. Accordingly, after the cylinder 55 has reached the end of its stroke, fluid will stop flowing through line 112 and proceed through hydraulic line 110 to the reversing valve 95. If the draper sections 22,24 are disconnected and separated as diagrammatically indicated in FIG. 13, the reversing valve 95 will direct the flow of fluid from the valve 95 through line 114 to the hydraulic motor 93, back out line 116 through the reversing valve 95 and onto the left hydraulic motor 91 via line 118. The fluid is then returned to the reservoir (not shown) through line 120, the valve 105 and the return line 104.

Figure 15:
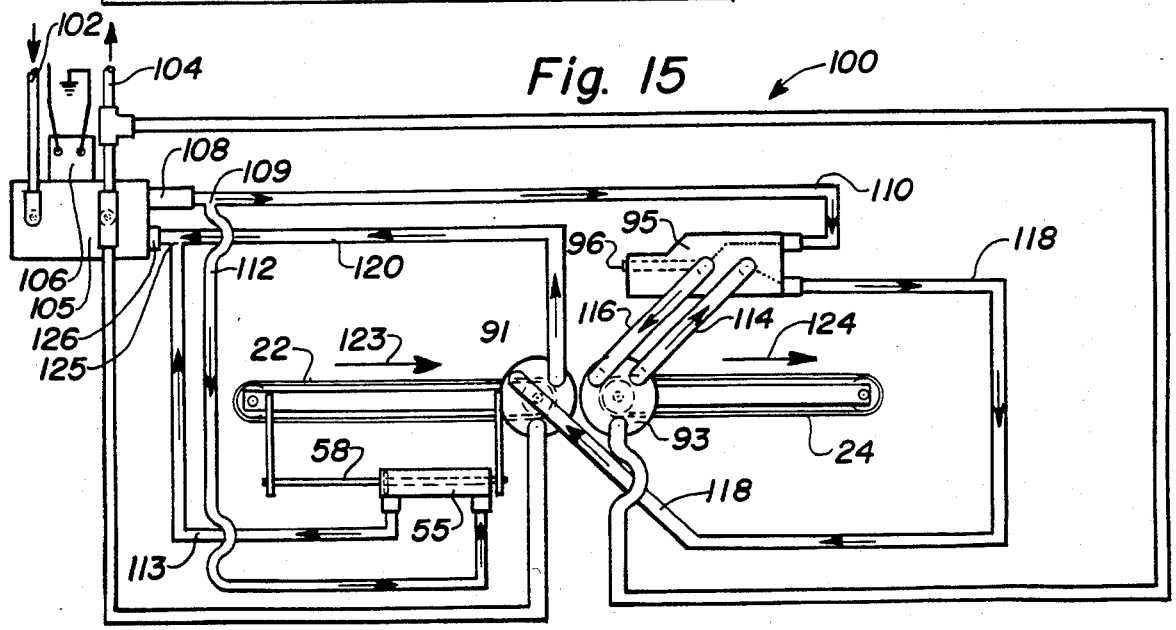
FIG. 15 is a diagrammatic view of the hydraulic system with the draper sections shifted to the left side to permit a crop discharge to the right side of the header.

It should be noted that in the flow path diagram in FIG. 13, the draper 21b is rotated in the opposite direction of draper 21a, as evidenced by arrows 121 and 122. The flow pattern diagrammed in FIG. 15 is similar to the flow pattern diagrammed in FIG. 13 except that the reversing valve changes the direction of fluid flow through the hydraulic motor 93 in the manner described above. After the hydraulic cylinder 55 has reached the end of its stroke shifting the draper sections 22,24 to the extreme left transverse position, hydraulic fluid flowing through line 110 enters the reversing valve 95 and is sent through line 116 to the hydraulic motor 93 and back out through line 114 to the reversing valve 95. This change in direction effects a rotation of the right draper 21b in the same direction as the left draper 21a, as shown by the directional arrows 123,124.

Figure 14:
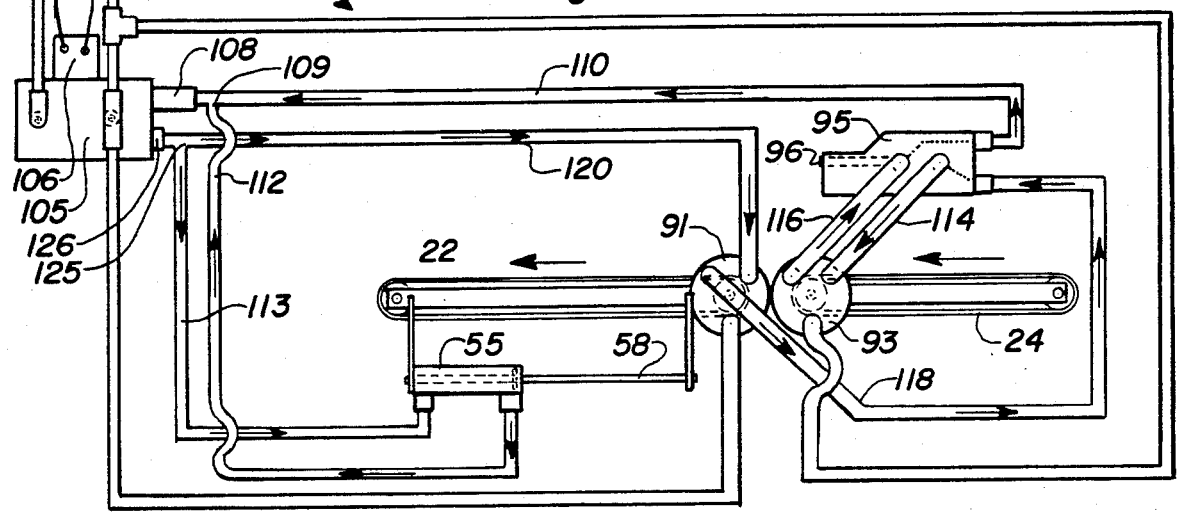
FIG. 14 is a diagrammatic view of the hydraulic system for the draper header with the draper sections shifted to the right side to permit a crop discharge to the left side of the header.

Referring now to the diagrammatic flow plan shown in FIG. 14, a shifting of the solenoid controlled spool 106 to cause the flow of fluid to 80 through line 126 from the valve 105 to the tee 125. As described above relative to FIG. 13, the flow of hydraulic fluid will flow through line 113 to cause the hydraulic cylinder 55 to work through the end of its stroke, shifting the left draper section 22 completely to the right, before actuating the hydraulic motors 91,93. When the hydraulic cylinder 55 has reached the end of its stroke, the draper sections 22,24 will be in the extreme right transverse position and the flow of fluid will proceed through line 120 to the left hydraulic motor 91. The hydraulic fluid 91 will then exit the hydraulic motor 91 through line 118 to the reversing valve 95 which has the spool 96 shifted such that the flow of fluid goes through line 114 to the right hydraulic motor 93, returning to the valve 95 through line 116 and then to the reservoir through line 110, valve 105 and return line 104.

As described relative to FIGS. 13–15 above, it can be seen that the hydraulic circuit 100 effects a shifting of the draper sections 22,24 completely into the respective transverse positions before starting the rotation of the respective drapers. To shift the draper sections 22,24 such that the discharge opening 28 is centrally located between the draper sections 22,24, it is necessary that the right draper section 24 be shifted into its extreme right transverse position to enable the retention mechanism 80 to hold the right draper section 24 in a fixed position relative to the header subframe 19. Then the release mechanism 70 is actuated through the cable 75 to unlatch the latching mechanism 60 and permit the left draper section 22 to be separated from the right draper section 24 by manipulating the hydraulic cylinder 55. After the hydraulic cylinder 55 has completed its stroke moving the left draper section 22 to its extreme left transverse position, the flow of hydraulic fluid will be diverted to the hydraulic motors 91,93 to rotate the drapers 21a,21b. To affect a shifting of both drapers 22,24 to the extreme left transverse position, the operator must connect the two draper sections 22,24 by moving the left draper section 22 adjacent the right draper section 24 through manipulation of the hydraulic cylinder 55. After the latching mechanism 60 has connected the two draper sections 22,24 together, the hydraulic cylinder 55 can be manipulated to shift both draper sections 22,24 to the extreme left transverse position. Likewise, the appropriate manipulation of the hydraulic cylinder can also move both draper sections 22,24 to the extreme right transverse position.

It will be understood that changes in the details, materials, steps and arrangements of parts which have been described and illustrated to explain the nature of the invention will occur to and may be made by those skilled in the art upon a reading of this disclosure within the principles of the scope of the invention. The foregoing description illustrates the preferred embodiments of the invention; however, concepts, as based on the description, may be employed in other embodiments without departing from the scope of the invention. Accordingly, the following claims are intended to protect the invention broadly, as well as in the specific form shown.

Having thus described the invention, what is claimed is:

1. In a crop harvesting machine for harvesting crop material from a field and having a mobile frame adapted for movement across the field; a generally transverse header subframe having laterally spaced ends forwardly mounted on said mobile frame; a reciprocating cutterbar forwardly mounted on said header subframe to sever standing crop material from the field and initiate the crop harvesting process, said cutterbar including first and second sickles reciprocatable in opposing directions to minimize vibrations in said subframe; drive means mounted on said header subframe to drive said first and second sickles from the respective ends of said header subframe; said drive means including first and second rotatable drive shafts extending toward the respective ends of said header subframe from a centrally located source of rotational power; and a laterally shiftable draper movably mounted on said header subframe rearwardly of said cutterbar for transverse movement relative to said subframe, said draper being rotatable to convey crop material in a lateral direction, the improvement comprising:

a stub draper affixed to said header subframe adjacent said second end, said stub draper being rotatable to convey crop material thereon laterally away from said second end toward said first end, said stub draper including a first rotatable drive member; and a flexible member interconnecting a second drive member affixed to said second drive shaft and said first drive member to transfer rotational power from said second cutterbar drive shaft to said stub draper to effect rotation thereof simultaneously with the operation of said cutterbar.

2. The crop harvesting machine of claim 1 wherein said flexible member is a belt, a tensioning idler being mounted on said header subframe for engagement with said belt.

3. The crop harvesting machine of claim 2 wherein said tensioning idler is mounted on a bracket, said bracket being pivotally connected to said header subframe by a pivot member, said header subframe having a slot-shaped hole therein for receiving said pivot member and permitting an adjustable movement relative to said belt, said tensioning idler being adjustably movable relative to said belt through a pivotal movement of said bracket and through a movement within said slot-shaped hole to change the attitude of said tensioning idler relative to said belt for proper alignment of said tensioning idler with said belt.

4. The crop harvesting machine of claim 3 wherein said tensioning idler is positionally movable relative to said mounting bracket to permit an adjustment of the tension in said belt without changing the position of said bracket.

5. The crop harvesting machine of claim 4 wherein said first and second drive members are rotatable in planes disposed at approximately 90° to each other.

6. The crop harvesting machine of claim 5 wherein said laterally shiftable draper is rotatably driven independently of said stub draper.

7. The crop harvesting machine of claim 6 wherein said laterally shiftable draper is driven by a hydraulic motor.

8. In a crop harvesting machine for harvesting crop material from a field and having a mobile frame adapted for movement across the field; a generally transverse header subframe having laterally spaced ends forwardly mounted on said mobile frame; a reciprocating cutterbar forwardly mounted on said header subframe to sever standing crop material from the field and initiate the crop harvesting process, said cutterbar including first and second sickles reciprocatable in opposing directions to minimize vibrations in said subframe; drive means mounted on said header subframe to drive said first and second sickles from the respective ends of said header subframe; said drive means including first and second rotatable drive shafts extending toward the respective ends of said header subframe from a centrally located source of rotational power; and a laterally shiftable draper movably mounted on said header subframe rearwardly of said cutterbar for transverse movement relative to said subframe, said draper being rotatable to convey crop material in a lateral direction, the improvement comprising:

a stub draper affixed to said header subframe adjacent said second end, said stub draper being rotatable to convey crop material thereon laterally away from said second end toward said first end, said stub draper including a first rotatable drive member;

a belt interconnecting a second drive member affixed to said second drive shaft and said first drive member to transfer rotational power from said second cutterbar drive shaft to said stub draper to effect rotation thereof; and a tensioning idler mounted on said header subframe for engagement with said belt by a bracket, said bracket being pivotally connected to said header subframe by a pivot member, said header subframe having a slot-shaped hole therein for receiving said pivot member and permitting an adjustable movement relative to said belt, said tensioning idler being adjustably movable relative to said belt through a pivotal movement of said bracket and through a movement within said slot-shaped hole to change the attitude of said tensioning idler relative to said belt for proper alignment of said tensioning idler with said belt.

9. The crop harvesting machine of claim 8 wherein said tensioning idler is positionally movable relative to said mounting bracket to permit an adjustment of the tension in said belt without changing the position of said bracket.

10. The crop harvesting machine of claim 9 wherein said stub draper is rotatably driven simultaneously with the driving of the reciprocative movement of said cutterbar.

* * * * *